(12) United States Patent
Takechi et al.

(10) Patent No.: US 6,525,698 B1
(45) Date of Patent: *Feb. 25, 2003

(54) SALES/INVENTORY MANAGEMENT SYSTEM USING A DISPLAY NOT DIRECTLY READABLE BY A PERSON TO INDICATE A TOTAL OF INPUT DATA SUCH AS COINS

(75) Inventors: Morimasa Takechi, Kyoto (JP); Kazuaki Morita, Izumo (JP)

(73) Assignee: Omrom Corporation, Kyoto (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/566,406

(22) Filed: Dec. 1, 1995

(30) Foreign Application Priority Data

Dec. 3, 1994 (JP) .............................. 6-329361
Oct. 17, 1995 (JP) .............................. 7-268791

(51) Int. Cl.⁷ .......................... G09G 5/00; G06F 17/00; G06K 9/80
(52) U.S. Cl. .................... 345/1.2; 700/236; 235/462.1; 235/462.49; 235/494
(58) Field of Search ............................ 345/1, 5, 179, 345/156, 2; 235/375, 385, 462, 463, 472, 381; 364/237.85, 479.02, 479.06; 382/135, 136, 314; 705/28

(56) References Cited

U.S. PATENT DOCUMENTS

| | | | | |
|---|---|---|---|---|
| 4,323,772 A | * | 4/1982 | Serge ........................ 235/463 |
| 4,369,442 A | * | 1/1983 | Werth et al. ........... 364/479.06 |
| 4,403,869 A | * | 9/1983 | Crutcher ..................... 368/239 |
| 4,608,487 A | * | 8/1986 | Awane et al. ............... 235/375 |
| 4,667,087 A | * | 5/1987 | Quintana ................... 235/382 |
| 4,689,757 A | * | 8/1987 | Downing et al. ...... 364/479.06 |
| 4,736,096 A | * | 4/1988 | Ushikubo ................... 235/472 |
| 4,864,112 A | * | 9/1989 | Imai et al. ............. 235/462.01 |
| 4,879,540 A | * | 11/1989 | Ushikubo ................... 235/385 |
| 4,907,250 A | * | 3/1990 | Ricks ..................... 364/479.02 |
| 4,999,617 A | * | 3/1991 | Uemura et al. ............. 345/156 |
| 5,003,251 A | * | 3/1991 | Fuoco ........................ 324/764 |
| 5,083,816 A | * | 1/1992 | Folga et al. ........... 235/462.07 |
| 5,153,842 A | * | 10/1992 | Dlugos, Sr. et al. .... 364/478.15 |
| 5,201,396 A | * | 4/1993 | Chalabian et al. .......... 194/217 |
| 5,272,321 A | * | 12/1993 | Otsuka et al. ............... 235/381 |
| 5,315,093 A | * | 5/1994 | Stewart ..................... 235/375 |
| 5,450,491 A | * | 9/1995 | McNair ...................... 235/380 |
| 5,513,264 A | * | 4/1996 | Wang et al. .................. 380/51 |
| 5,523,794 A | * | 6/1996 | Mankovitz et al. ........... 705/14 |
| 5,535,147 A | * | 7/1996 | Jacobs et al. ............. 364/708.1 |
| 5,594,228 A | * | 1/1997 | Swartz et al. ............... 235/383 |
| 5,682,030 A | * | 10/1997 | Kubon .................. 235/462.25 |
| 5,767,896 A | * | 6/1998 | Nemirofsky ................. 348/13 |
| 6,142,368 A | * | 11/2000 | Mullins et al. ......... 235/472.01 |

FOREIGN PATENT DOCUMENTS

| | | | |
|---|---|---|---|
| JP | 359128627 A | * | 7/1984 |
| JP | 60-003784 | | 1/1985 |
| JP | 04-108479 | | 4/1992 |
| JP | 06-111143 | | 4/1994 |
| JP | 06-295376 | | 10/1994 |

\* cited by examiner

*Primary Examiner*—Steven Saras
*Assistant Examiner*—Paul A. Bell
(74) *Attorney, Agent, or Firm*—Foley & Lardner

(57) ABSTRACT

The invention provides a data display device and a system which display a sales amount or number of coins inserted into, for example, a game machine in a form not directly comprehensible to a person in order to prevent reading by an unauthorized person. This prevents dishonest acts or pilfering by the unauthorized person. This form, not directly comprehensible, can be a bar code. The unauthorized person can read the sales data only by a bar code reader, so he will have no way to know the sales amount to match with the actual collected amount of the coins.

8 Claims, 15 Drawing Sheets

SALES/INVENTORY MANAGEMENT SYSTEM USING A DISPLAY NOT DIRECTLY READABLE BY A PERSON TO INDICATE A TOTAL OF INPUT DATA SUCH AS COINS

FIELD OF THE INVENTION

This invention provides a data display device which displays bar codes and sales/inventory management systems using the data display. More specifically, it concerns a data display device ideally suited for displaying as a bar code or in some other form not directly comprehensible to a person the number of coins, tokens, etc. or the amount of money inserted in, for example, a game or amusement machine to operate that machine.

This invention also provides sales/inventory management systems which proceed after coin payment. These systems read the bar code or other data displayed on the data display device swiftly and accurately. It also prevents an operator's pilfering of the coins handled because the data, such as a total amount of the sale, is illegible to an unauthorized person.

BACKGROUND OF THE INVENTION

In, for example, a game machine of the prior art, the number of coins, tokens, bills, balls or other money substitutes (hereafter, "coins") inserted is calculated mechanically by an electromagnetic counter, detector or the like. The value calculated is displayed in the form of Arabic numerals. The displayed value can be, therefore, read visually by the operators, and sales/inventory management is executed through subsequent data processing based on the data visually read by the operators.

In this example of the prior art, the displayed value is read visually, and human error sometimes occurs. When the value is read incorrectly, the subsequent data processing will also have errors in it, and the sales and product control information will be inaccurate.

Another potential problem is that a person knowledgeable about electromechanical devices can alter the total amount which is displayed by manipulating the electromagnetic counter. By intentionally altering the total, a dishonest person can embezzle sales receipts. To prevent pilfering or stealing accomplished by this sort of deception, one could separate the task of reading out the total from that of collecting the coins which have accumulated in the game machine and check the results against each other. However, this would require two people, one to read out the total and the other to collect the money.

SUMMARY OF THE INVENTION

An object of this invention is to provide a data display device which would make it difficult for an unauthorized person to read the data for a total number of coins inserted or an amount of money inserted so as to prevent pilfering or stealing accomplished by falsifying totals. This data display device would also prevent misreadings due to human error, and would be ideally suited for accurate and speedy control of sales.

Another object of this invention is to provide a sales and inventory management system after coin payment which prevent misreadings due to human error, and would be suited for accurate and speedy management of sales. This system would also prevent pilfering or stealing accomplished by falsifying totals.

The data display device has a coin counter unit to count the output data of a coin detector. The coin detector detects the fact that a coin has been inserted. The device has also a display unit to display, in a form not directly comprehensible to a person, either the value counted by the coin counter unit or the total amount of money inserted based on this value, or both.

The aforesaid display unit should have a display, for example, a liquid crystal display, on which a bar code is displayed and a driving circuit to drive the display.

The display unit should have a built-in battery and a device to keep track of the amount of charge remaining in that battery. The aforesaid display unit should also display whether the charge remaining in the aforesaid battery is below a given level. This could be done by means of a battery symbol which would appear next to the bar code.

The display unit should also have a start switch. In response to the actuation of this start switch, the bar code would appear on the aforesaid display device for a specified period of time.

The aforesaid counting unit should count only output pulses from the aforesaid coin detector which have a specified pulsewidth.

The aforesaid coins may be actual coins, tokens, banknotes, game balls, or some other currency substitute, or some combination of these. The aforesaid coin detector may be installed in a game machine, an amusement machine, or an automatic vending machine.

The aforesaid bar code is equivalent to a standard product code which is widely used in the market.

The bar code display unit according to this invention counts the number of coins inserted into a machine and displays either this value, the amount of money inserted as based on this value, or both. Because it displays this value in the form of a bar code, the number of coins or the amount of money inserted will not be legible to an unauthorized person.

The use of a bar code reader allows the operator to obtain a total swiftly and accurately. This method prevents errors due to reading the total by human eye, and it also prevents pilfering and stealing accomplished by deception, as by tampering with the counters.

Because the data display device has a built-in battery, it does not need to be supplied with power from the exterior. This gives the user great freedom in regard to where the display can be installed. Because the device keeps track of and displays the amount of charge left in the battery, it need never malfunction due to the effects of a dead battery.

The bar code is displayed for a given period of time only when the start switch is actuated. This arrangement is chosen to reduce power consumption.

The aforesaid coin counter unit counts only the output pulses of the coin detector which have a specified pulsewidth. This prevents the calculation from being affected by chattering so that an accurate total can be obtained.

The aforesaid bar code will be equivalent to a standard product code used widely in the market. This will ensure that it can be read easily and that a general-purpose bar code reader can be used.

The sales and inventory management system which proceeds after coin payment includes the data display device according to above, a reader and processing unit to read and process the displayed bar code to convert the displayed bar code to the total of incoming coins.

The sales/inventory management system which proceeds after coin payment further includes a calculating means to calculate a total sale amount based on the total of incoming coins obtained by a plurality of the reading and processing means.

It would also be preferable that the bar code converting means to convert a total of incoming coins to a bar code further include a coin detecting means to detect the type of the incoming coins. These systems according to this invention would be suited for game machines and amusement machines.

It would be preferable that systems according to this invention, further include an electrical interface unit to interface driver circuits between the coin detector unit, the display units and a main frame of said sales/inventory management systems, and a system detecting unit to detect a disconnection of the electrical interface unit, and to render this system inoperative when the disconnection is detected. This arrangement helps prevent pilfering.

According to the invention, users insert coins in a machine, for example, a game machine. The coin detector detects what kind of coins are inserted. The processing unit calculates the number of the inserted coins and/or an amount of the coins, which is the sales amount. These data are, then, displayed on the display in a form not directly comprehensible to a person, such as in a form of bar code. When an authorized operator wishes to know the amount of sales, the sales data displayed by bar code is read by a bar code reader. The operator can also collect the coins from the game machine. Since the operator has no way to know from the displayed data how much the sales were, there is no way to pilfer the coins which are being collected.

The system can also detect a disconnection of the electrical interface unit which interfaces between driver circuits for the processing unit/the display means, and a main frame of the system. When someone disconnects the electrical interface intentionally for deception, the system will be rendered inoperative. This configuration will prevent pilfering and stealing.

DETAILED DESCRIPTION OF THE INVENTION

We shall next give a detailed explanation of a preferred embodiment of this invention with reference to the drawings.

Figure 1:
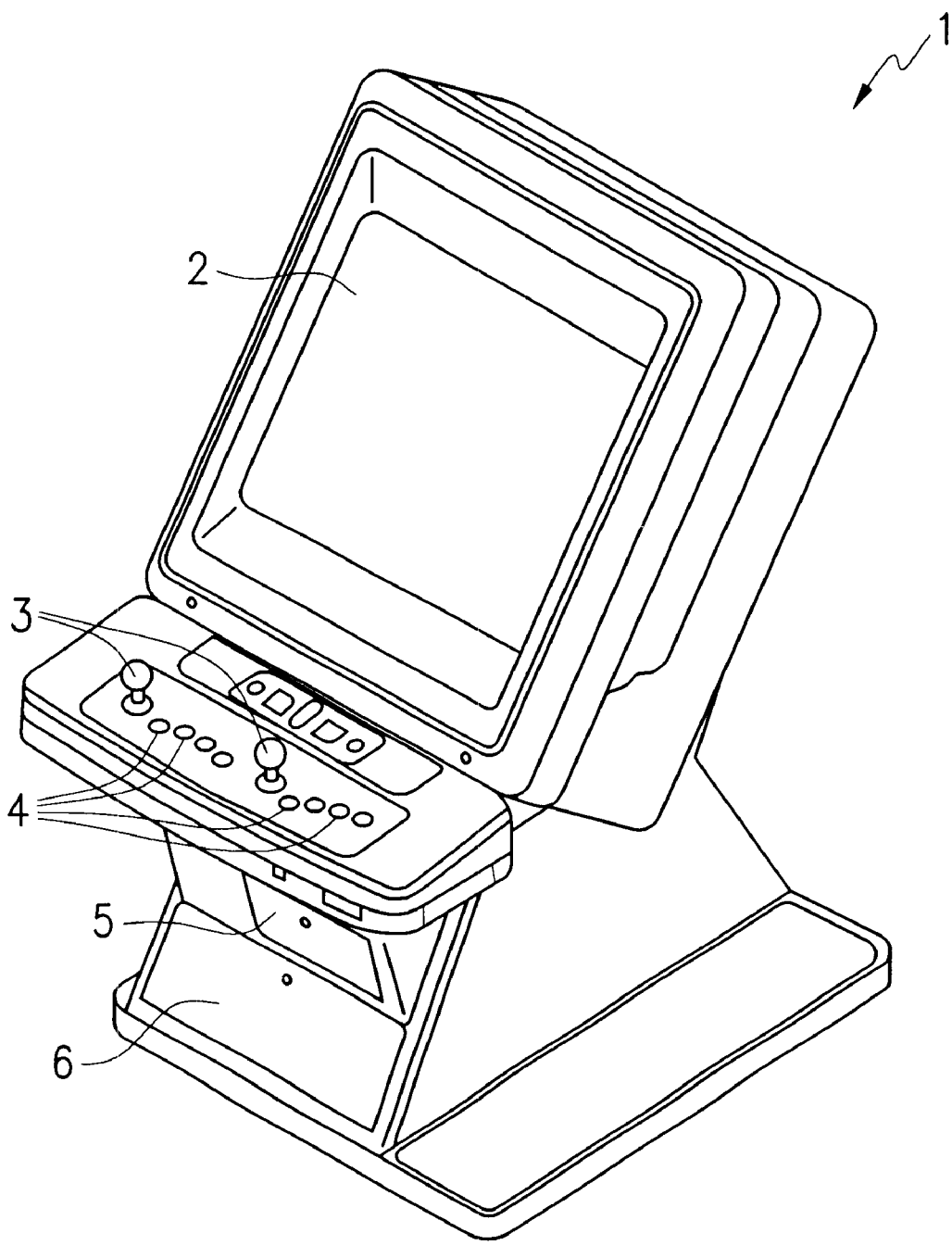
FIG. 1 is a perspective drawing of a game machine in which a data display device according to this invention is installed.

FIG. 1 is a perspective drawing of game machine 1. This machine has a built-in bar code display which is a data display device according to this invention.

On the front of game machine 1 is display 2, which displays the game. In front of the display is the operating panel, with a joystick 3 and a set of operating buttons 4. Below the operating panel are cashbox 5 and PC board door 6.

A case is built into cash box 5 to contain the coins which are inserted in game machine 1 to start the game. A bar code display device according to this invention is mounted in a convenient location for maintenance, using a mounting scheme discussed further herein. Inside game machine 1 is a coin detector which detects each inserted coin, also discussed further herein.

Figure 2:
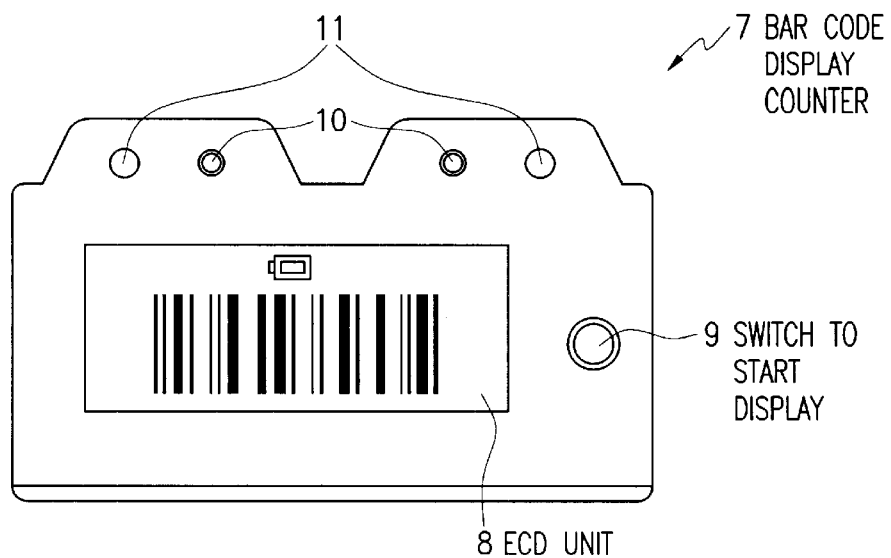
FIG. 2 is a frontal view of the data display device displaying a bar code.
Figure 3:
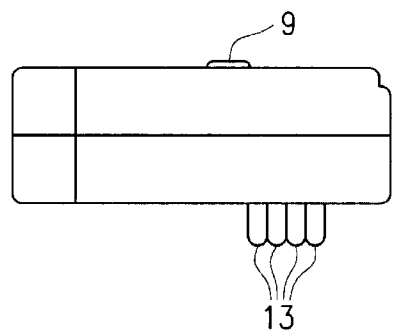
FIG. 3 is a lateral view of the data display device shown in FIG. 2.
Figure 4:
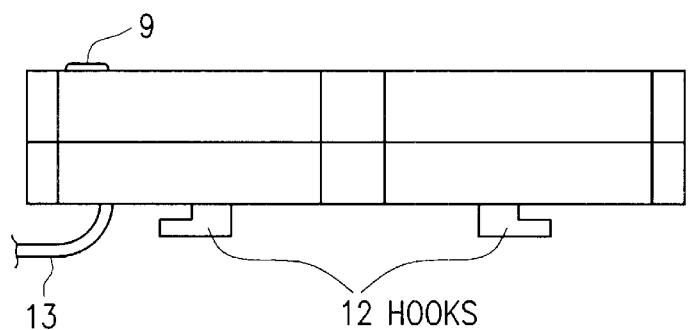
FIG. 4 is another lateral view of the data display device shown in FIG. 2.

FIG. 2 is a frontal view of bar code display device 7 which is designed according to this invention. FIG. 3 is a lateral view of device 7 as seen from the left side of FIG. 2. FIG. 4 is a lateral view from above, and FIG. 5 is a view of the back of the device shown in FIG. 2.

Bar code display device 7 calculates the output signals of the coin detector which detects the coins inserted in game machine 1. It displays the total value, i.e., the number of coins inserted, in the form of a bar code.

On the front of bar code display device 7 shown in FIG. 2, is rectangular dot matrix-type liquid crystal display 8. On one side of liquid crystal display 8 is start switch 9, which when actuated causes the total number of coins to be displayed as a bar code for a specified period of time. Above liquid crystal display 8, near the edge of the case, are two screw holes 10, which are used to mount device 7 by screws to an internal panel in game machine 1. On the outer sides of holes 10 are two through holes 11, which are used to mount device 7 to the interior of game machine 1 by means of mounting hardware which will be discussed later.

Figure 5:
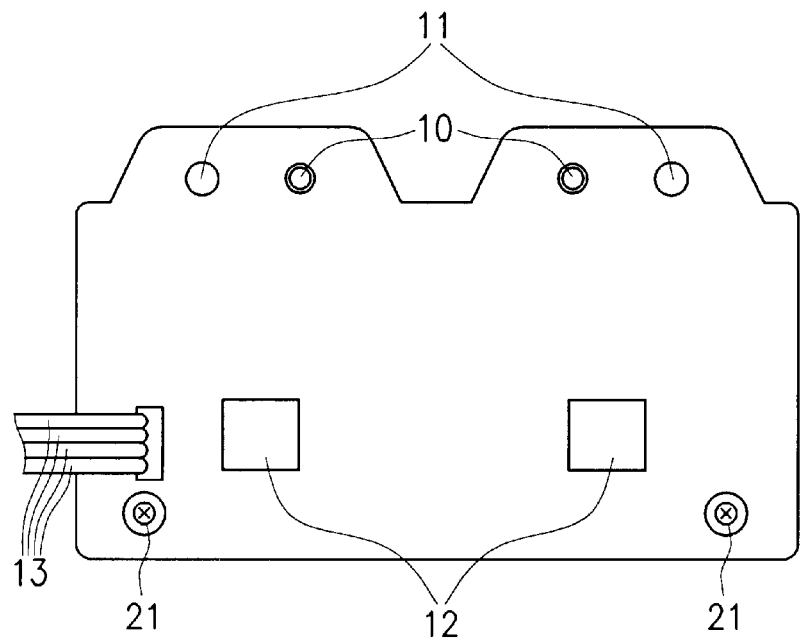
FIG. 5 is a rear view of the data display device shown in FIG. 2.

On the back of bar code display device 7, as can be seen in FIGS. 4 and 5, are two L-shaped hooks 12, which engage with the aforesaid mounting hardware when the device is mounted to the hardware. Near one of hooks 12 is exterior wiring 13, comprising wires $13_1$ through $13_4$, which are connected to game machine 1.

Figure 6:
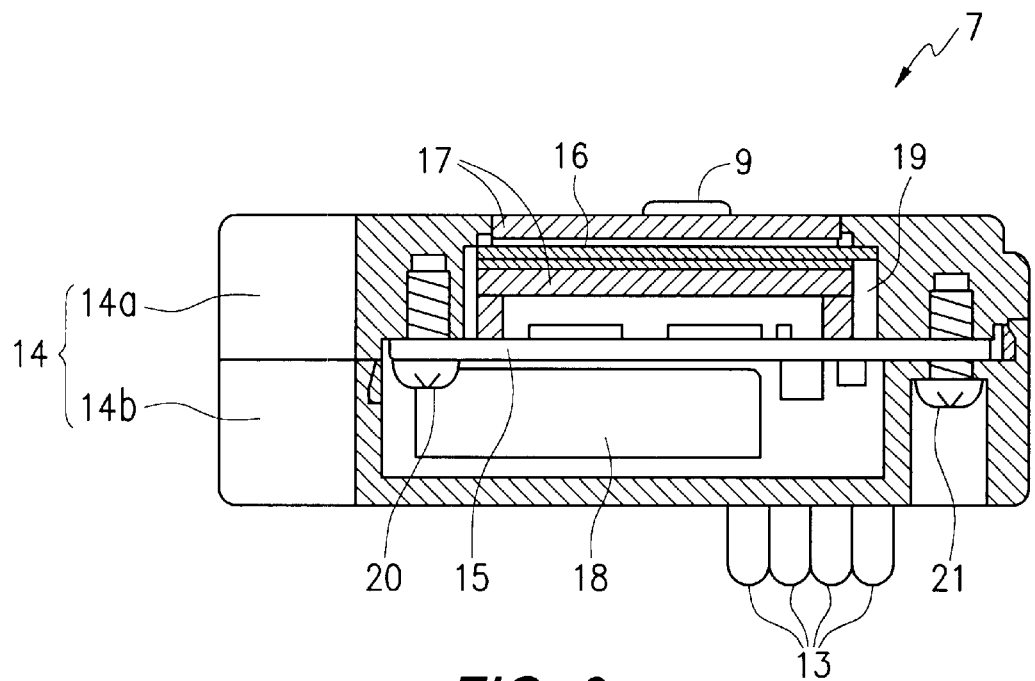
FIG. 6 is a cross section of the data display device shown in FIG. 2.

FIG. 6 is a cross section of the interior of bar code display device 7. Device 7 is enclosed in case 14, which comprises upper case 14a and lower case 14b. Inside case 14 is circuit board 15, on which the electronic components are mounted. Above circuit board 15 are reflecting type LCD panel 16, which constitutes liquid crystal display 8, and panel holder 17, which supports panel 16. Battery 18, which supplies the power, is below circuit board 15. LCD panel 16 and circuit board 15 are connected by means of conductive resin. Circuit board 15 is anchored to upper case 14a by screw 20. Screw 21, which is inserted from the outside of case 14, is anchored through both lower case 14b and upper case 14a. Because LCD panel 16 and battery 18 are placed on opposite sides of circuit board 15, the projective area of bar code display device 7 can be made smaller than if the panel and battery are placed on the same side of circuit board 15.

Because bar code display device 7 has a built-in battery 18, there is no need to supply power from the exterior. This allows the user more options in selecting where he wishes to mount the device.

It would, of course, be possible to substitute a transmitting-type panel for reflecting-type liquid crystal display panel 16.

Figure 7:
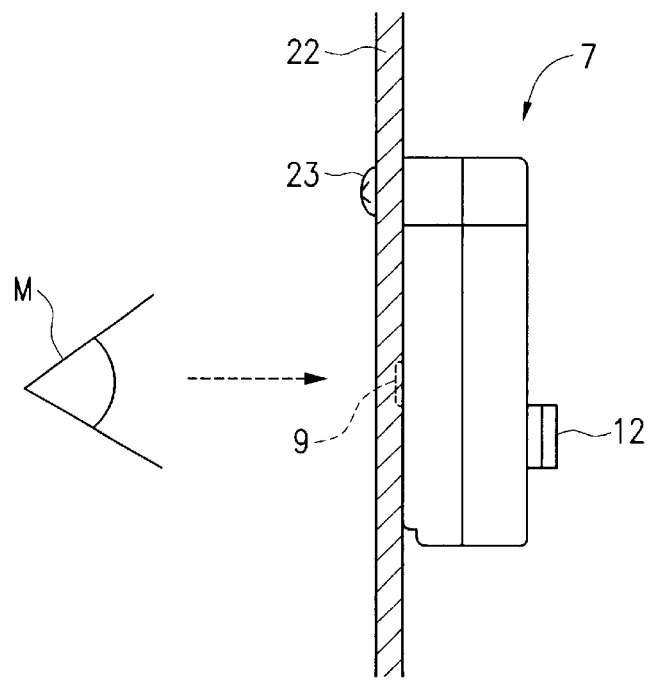
FIG. 7 is a lateral view of the data display device when it is mounted.
Figure 8:
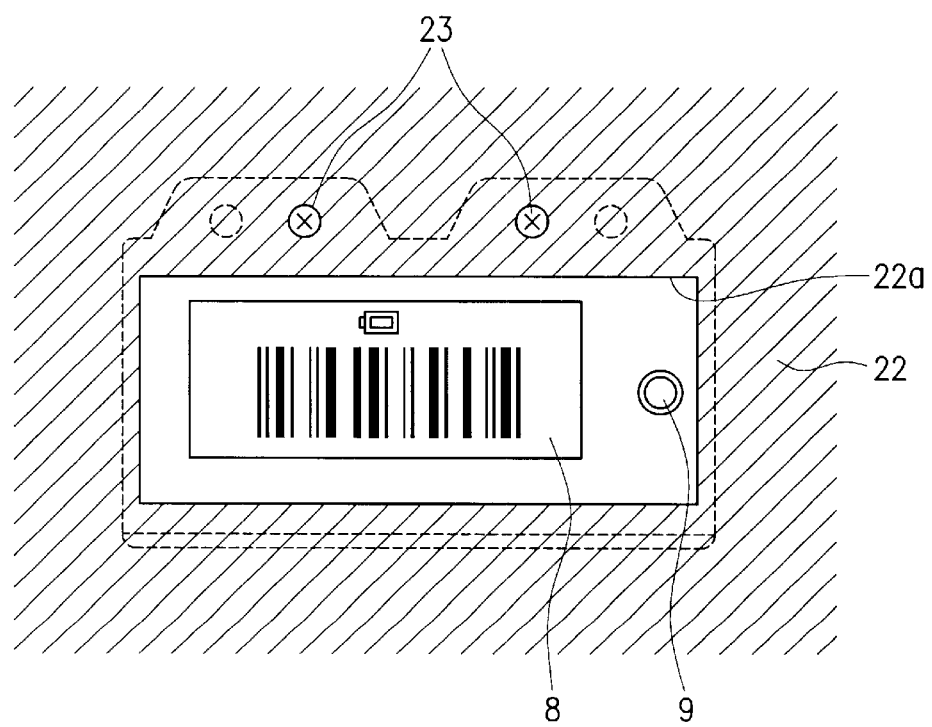
FIG. 8 is a frontal view of the data display device shown in FIG. 7.

FIG. 7 is a lateral view of a bar code display device 7 configured as described above. In this figure, the device is mounted by screws 23 in an appropriate location on panel 22 inside the cash box of game machine 1, pictured in FIG. 1. FIG. 8 is a plan view of the same device. The oblique lines represent panel 22.

In panel 22 is a rectangular opening 22a. Device 7 is mounted to panel 22 by means of screw holes 10 so that liquid crystal display 8 and start switch 9 on device 7 can be seen through opening 22a.

Employee M, for example, who is charged with reading the bar code, opens the cash box in game machine 1 and actuates start switch 9 on bar code display device 7. This enables him to view the bar code shown on liquid crystal display 8 and to read it with a hand-held bar code reader (such as 107 in FIG. 19, discussed further herein.

In another embodiment of this invention, a guide could be mounted on device 7 to ensure that the angle of the bar code reader with respect to liquid crystal display 8 on device 7 is suitable for reading the bar code. Then the start switch can be placed somewhere on the guide where it will be actuated when the bar code reader makes contact with it.

As has been discussed, bar code display device 7 may be mounted directly on panel 22. Alternatively, it may be mounted on an interior wall of the cash box by means of mounting plate 24, which is pictured in FIG. 9.

Figure 9A:
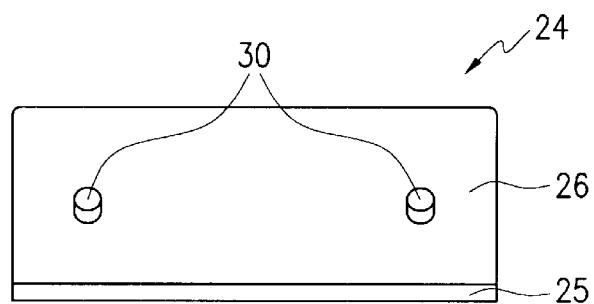
FIG. 9 shows a mounting hardware for the data display device.
Figure 9B:
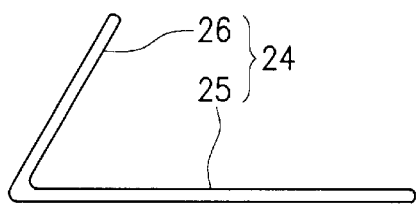
Figure 9C:
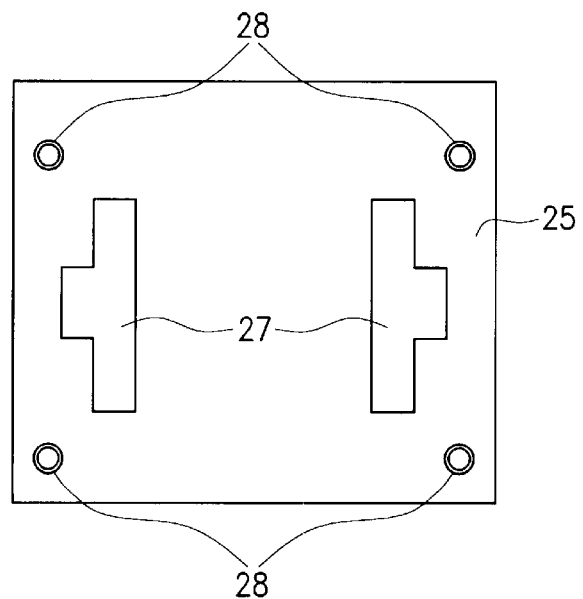

FIG. 9(A) is a frontal view of mounting panel 24. FIG. 9(B) is a lateral view, and FIG. 9(C) is a view of the bottom on the plate.

Mounting plate 24 includes rectangular plate 25, which supports bar code display device 7, and mounting panel 26, which is bent back on one side of plate 25.

Figure 10:
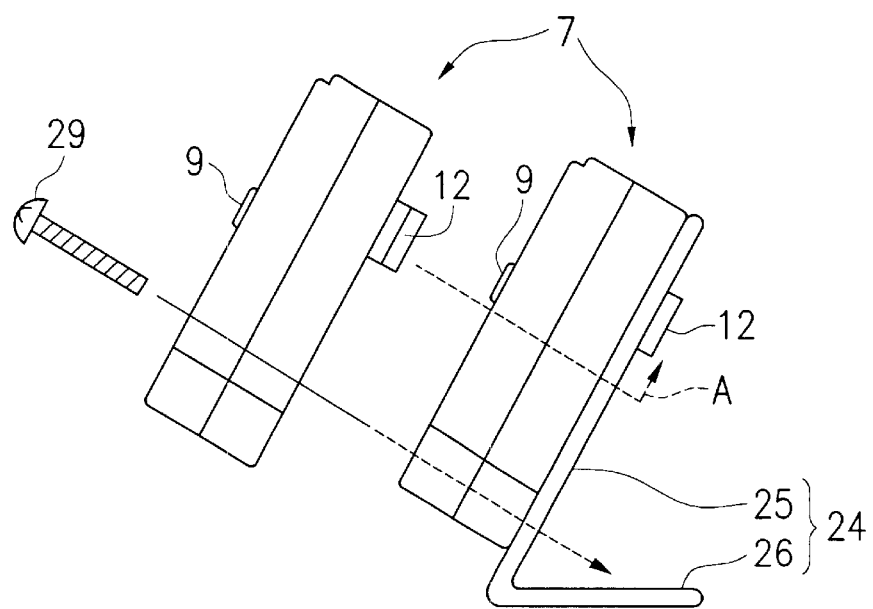
FIG. 10 is a lateral view of how the data display device is mounted to the mounting hardware.
Figure 11:
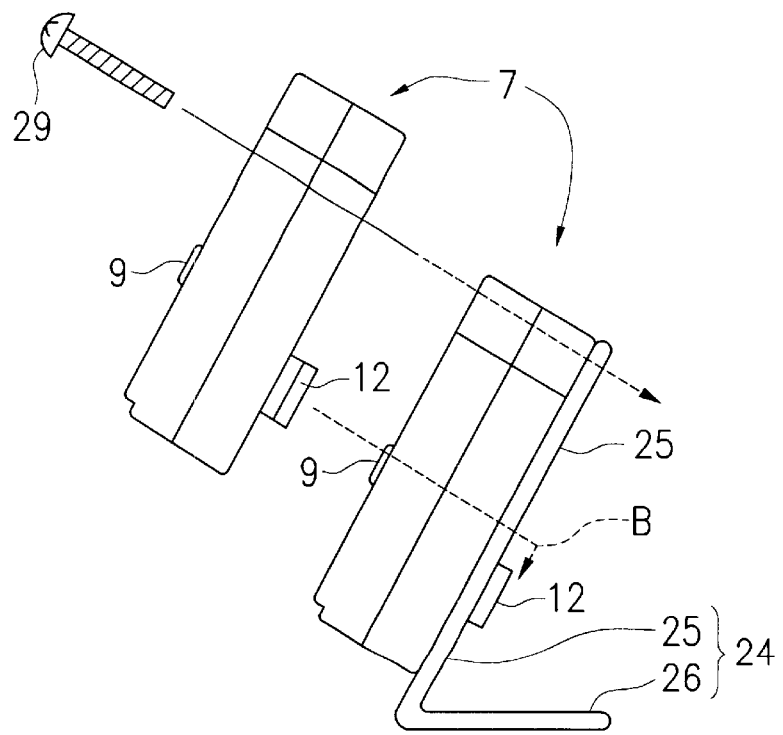
FIG. 11 is a lateral view of how the data display device is mounted to the mounting hardware.

Support plate 25 has two holes 27 which engage the aforesaid hooks 12 on device 7. Four screw holes 28 are provided in the corners of plate 25 through which device 7 can be anchored to the plate. Holes 27, which are parallel to each other, have a wider section cut out in their centers. As can be seen in FIG. 10 or 11, hooks 12 on device 7 are inserted into these wider sections and pushed either upward or downward, as indicated by arrows A and B, until through holes 11 on device 7 are directly over screw holes 28. The device can then be anchored to mounting plate 24 by screws 29.

As can be seen in FIG. 9(A), mounting panel 26 has two through holes 30. When bar code display device 7 has been anchored to support plate 25, the mounting plate 24 can be fixed in an appropriate location to one of the interior walls of the cash box by screws inserted through holes 30.

Figure 12:
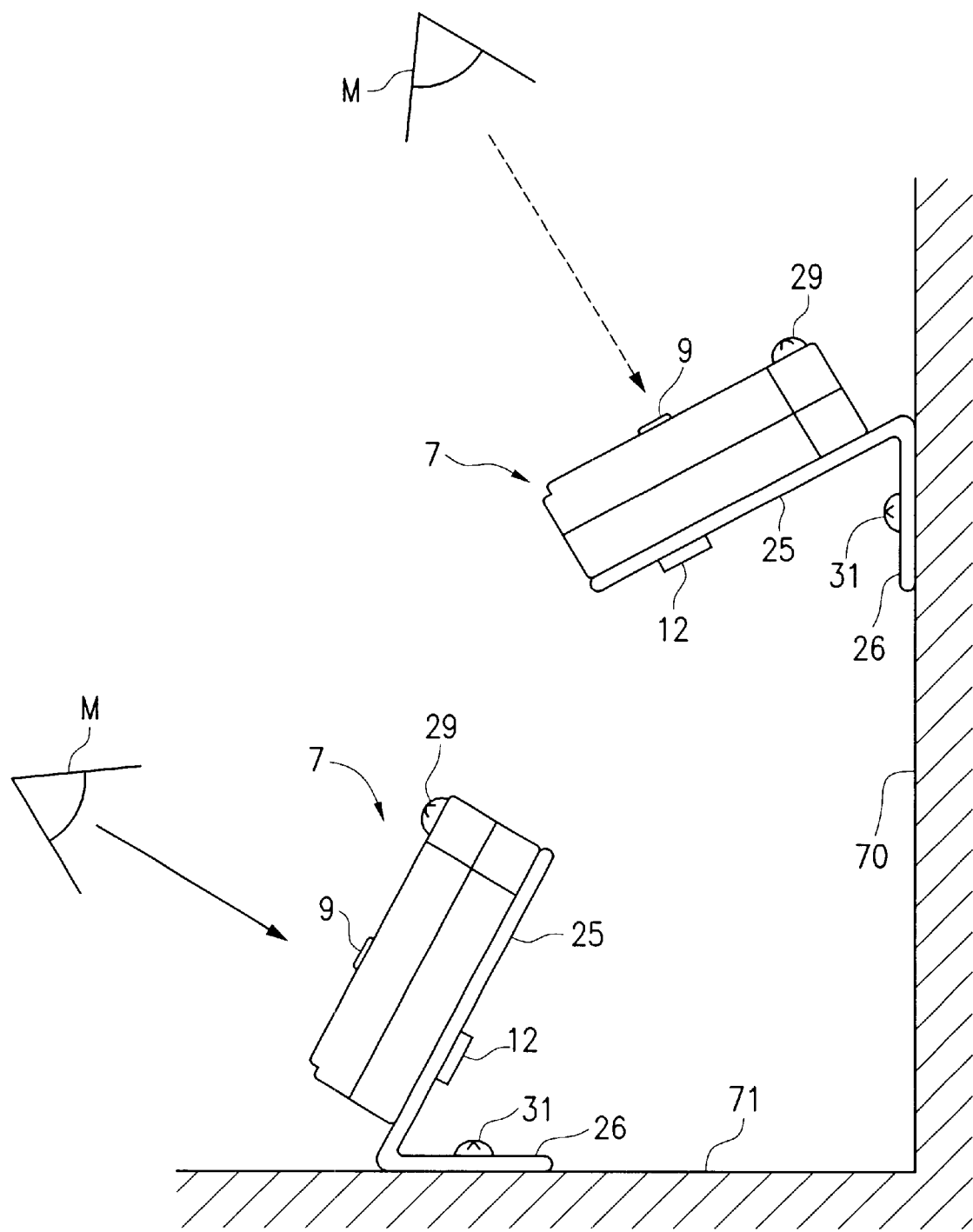
FIG. 12 is a lateral view showing how the data display device can be mounted using the mounting hardware.

When bar code display device 7 is mounted on plate 24 as shown in the aforesaid FIG. 10 or 11, plate 24 can be anchored by screws 31 to the interior wall 70 or base 71 of the cash box, shown in FIG. 12.

Mounting plate 24 allows the user to mount the device in the location of his choice. When employee M, who is charged with reading the bar code, opens the cash box in game machine 1, he actuates start switch 9 on bar code display device 7. This enables him to view the bar code shown on liquid crystal display 8 and to read it with a hand-held bar code reader.

Because the support plate of mounting plate 24 is bent at an angle from its mounting panel, liquid crystal display 8 on device 7 can be placed at whatever angle makes it easiest to read.

Although mounting plate 24 in this embodiment is formed from a metal plate, it would be equally acceptable to make it from a resin or some other material.

Figure 13:
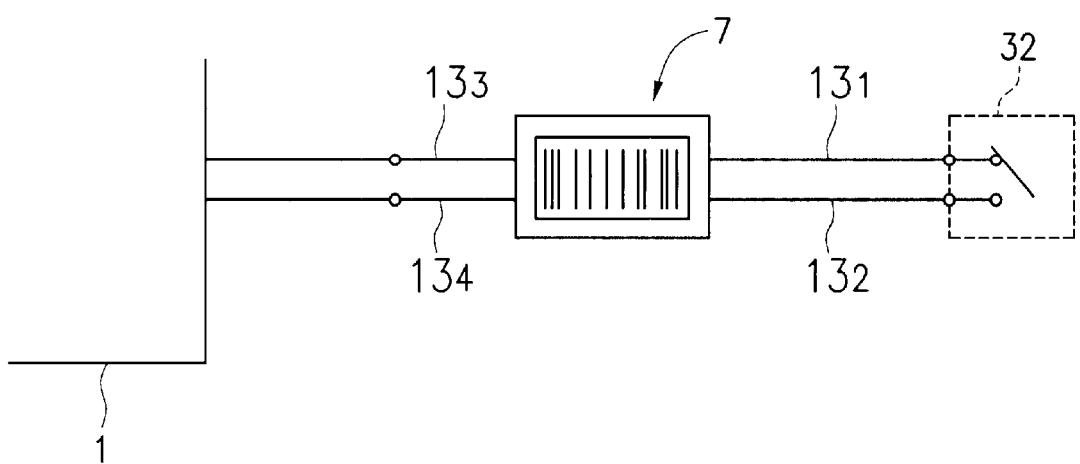
FIG. 13 shows how the data display device is connected to other devices.
Figure 14:
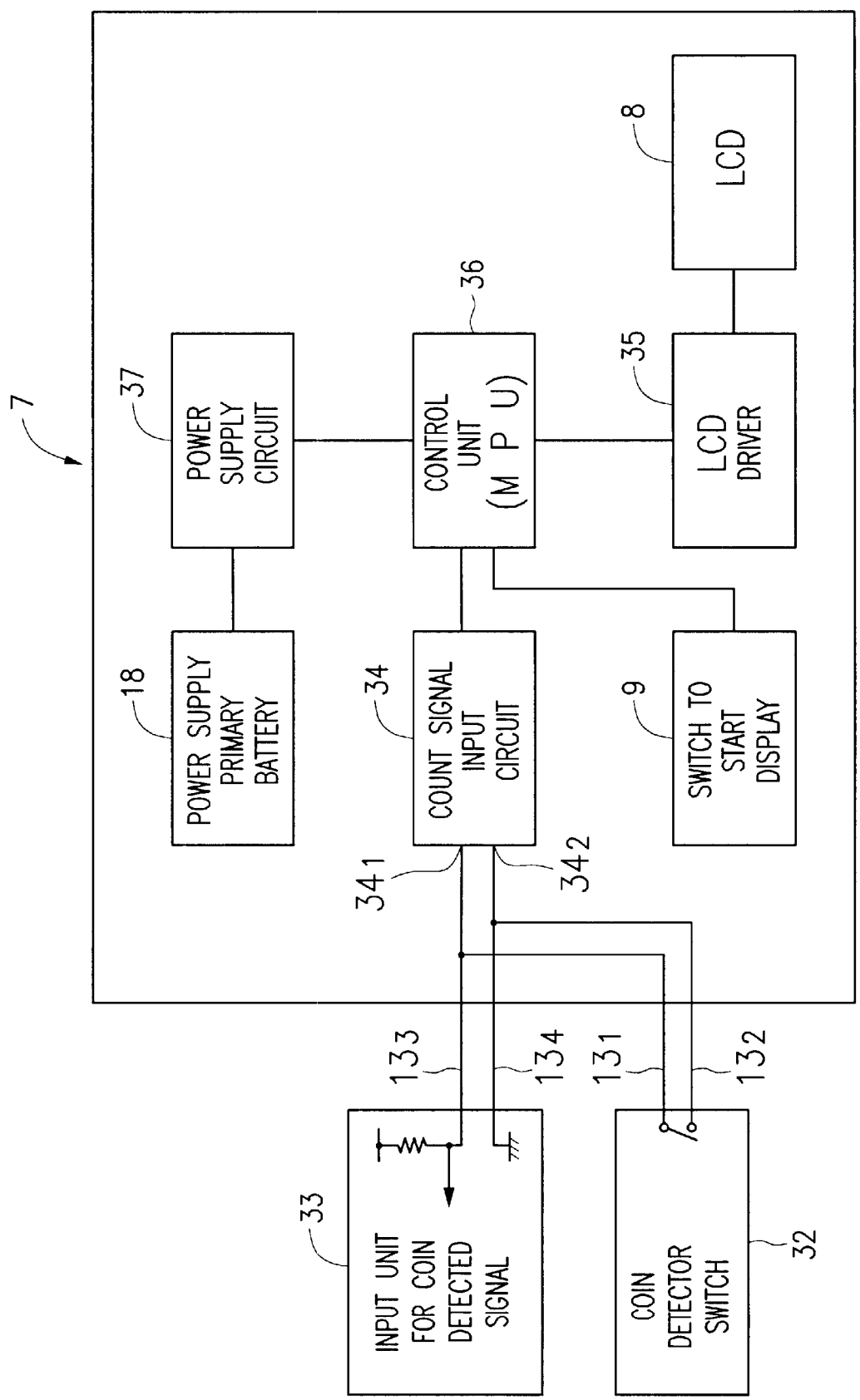
FIG. 14 is a block diagram of the configuration shown in FIG. 13.

FIG. 13 illustrates how a bar code display device 7 with the configuration described above would be connected to game machine 1 and to coin detector 32, which is attached to the game machine. FIG. 14 is a block diagram of the configuration shown in FIG. 13. The corresponding components have been given the same numbers.

Game machine 1 has a coin detector 32 to detect each coin inserted into the machine. Coin detector 32 is connected to bar code display device 7 by two external wires, $13_1$ and $13_2$. Device 7 is connected to the power supply and the ground of coin-signal input terminal 33 by external wires $13_3$ and $13_4$, respectively.

Game machine 1 begins working and starts its game only when a signal from coin detector 32 is input to coin-signal input terminal 33.

Bar code display device 7 has, as its power supply, the aforesaid battery 18; power circuit 37, which supplies the power from battery 18 to the various components; circuit 34, into which is input the signal from coin detector 32; and control unit (MPU) 36, which calculates the output of coin-signal receiving circuit 34 and controls LCD driver 35 in response to the actuation of the aforesaid switch 9, performing various control operations to display the calculated value as a bar code on LCD 8 for a specified period of time.

As is shown in FIG. 14, coin-signal receiving circuit 34 of bar code display device 7 has two input units, $34_1$ and $34_2$. The signal lines of exterior wires $13_1$ and $13_2$, which run from coin detector 32, and exterior wires $13_3$ and $13_4$, which run from coin-signal input terminal 33, are connected in common by internal wiring in device 7 to input units $34_1$ and $34_2$. Thus the signal from coin detector 32 will be transmitted to coin-signal receiving circuit 34 of device 7, and by the same token, it will be transmitted via internal wiring in device 7 to coin-signal input terminal 33 in game machine 1.

If exterior wires $13_3$ and $13_4$, which run between game machine 1 and bar code display device 7, were cut, game machine 1 could ordinarily still run when a coin was put in, but it would no longer be possible to keep a total of the coins inserted. In this case a person might conceivably try to steal money by falsifying the total. However, with this configuration, when exterior wires $13_3$ and $13_4$ are cut, the signal from coin detector 32 is not transmitted to coin-signal input terminal 33 in game machine 1, and the game will not start. This arrangement, then, effectively prevents this sort of pilfering.

As was discussed above, the bar code display device 7 of this embodiment has two pairs of exterior wires, one consisting of $13_1$ and $13_2$ and the other of $13_3$ and $13_4$, connected, respectively, to coin detector 32 and coin-signal input terminal 33 of game machine 1. The wiring is non-polarized, so it does not matter which of pairs $13_1$–$13_2$ and $13_3$–$13_4$ is connected to coin detector 32 and which to coin-signal input terminal 33. This scheme obviates the need to check the polarity of the wiring location, and it makes it easy for an inexperienced person to do the wiring.

Figure 15:
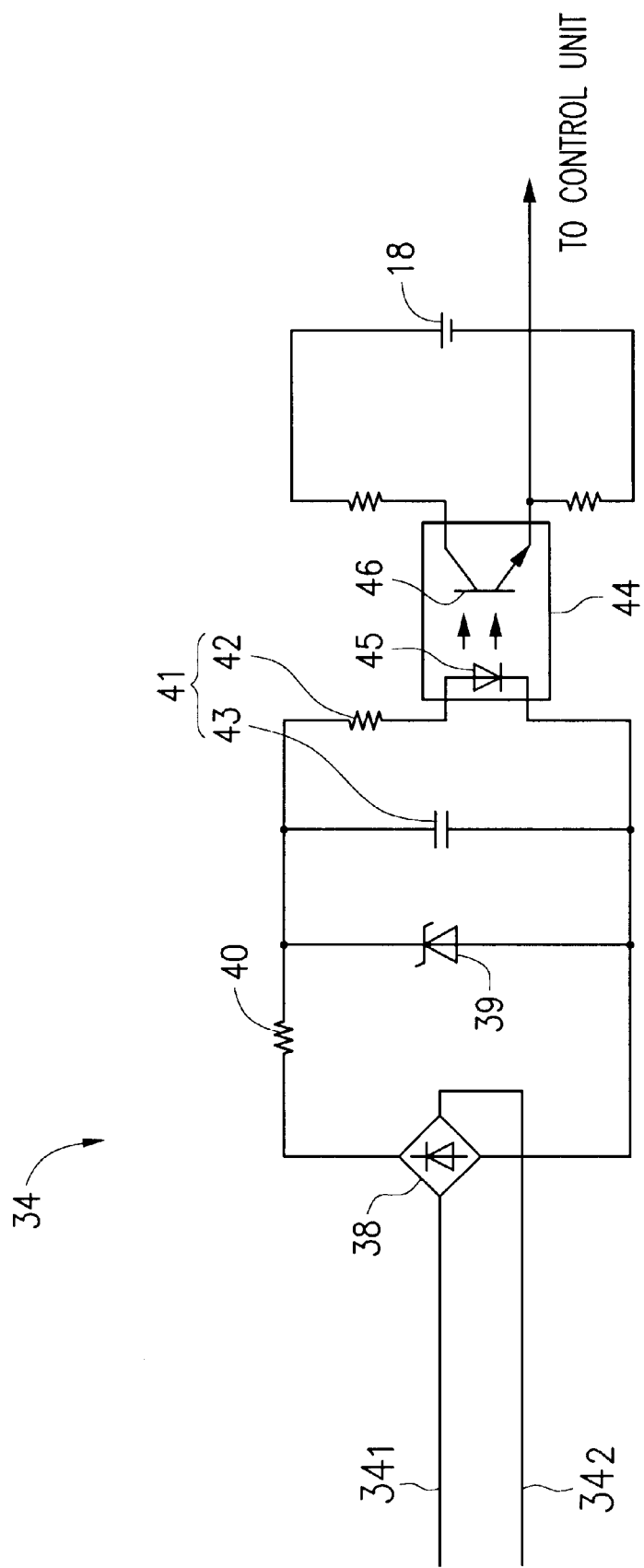
FIG. 15 is a diagram of a coin counter circuit in FIG. 14.

FIG. 15 is a circuit diagram of coin-signal receiving circuit 34 in FIG. 14.

In FIG. 15, 38 is a full-wave rectifier circuit; 39 is a fixed-voltage diode; 40 is a current-limiting resistor; 41, which consists of resistor 42 and capacitor 43, is a circuit to remove chattering; and 44 is a photocoupler.

Input to full-wave rectifier circuit 38 comes via the two input units $34_1$ and $34_2$ of count-signal input circuit 34. As was discussed above, coin detector 32 and coin-signal input terminal 33 of game machine 1 are connected in common. The output of full-wave rectifier circuit 38 is transmitted to luminous element 45 of photocoupler 44 by way of current limit resistor 40 and circuit 41, which removes chattering. The output of photodetector element 46 in photocoupler 44 is transmitted to the aforesaid control unit 36.

Because coin-signal receiving circuit 34 has a full-wave rectifier circuit 38, the output to photocoupler 44 will have the same polarity regardless of the polarity at input units $34_1$ and $34_2$ of the rectifier circuit. Therefore it does not matter which of external wire pairs $13_1$–$13_2$ or $13_3$–$13_4$ is connected to coin detector 32 and which to coin-signal input terminal 33. The wiring can be laid without regard to polarity.

Each pair of external wires, $13_1$–$13_2$ and $13_3$–$13_4$, is coated with a different color of insulation, e.g., blue and white.

Let us consider what happens to a coin-signal receiving circuit 34 configured as described above when no coin has been inserted in the machine, i.e., when coin detector 32 is off. Because voltage is applied to input units $34_1$ and $34_2$ of full-wave rectifier circuit 38, the output of circuit 38 will cause luminous element 45 of photocoupler 44 to emit light. Photodetector element 46 is actuated, and its output to control unit 36 is high. When a coin is inserted and coin detector 32 goes on, voltage is not applied to input units $34_1$ and $34_2$ of full-wave rectifier circuit 38. Luminous element 45 of photocoupler 44 will not emit light, and photodetector element 46 will be off. The output to control unit 36 will go low.

When the low-level signals representing individual coins being inserted are calculated by control unit 36, the total number of coins inserted is obtained.

When start switch 9 is actuated, the coin total calculated in this way is displayed as a bar code for a specified period of time on LCD 8.

Figure 16:
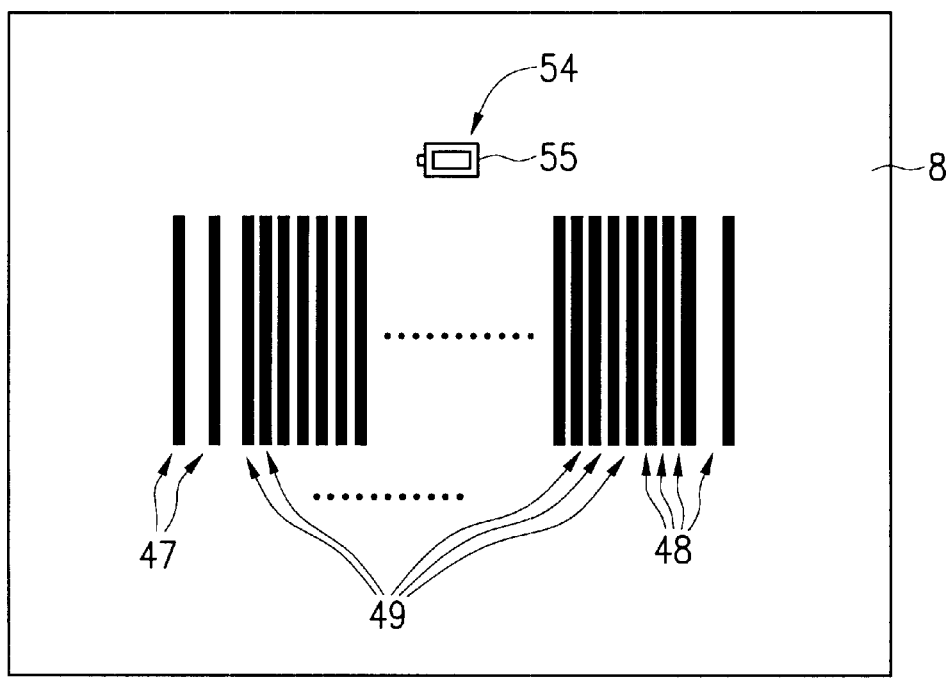
FIG. 16 shows the appearance of the LCD.

FIG. 16 shows what appears on LCD 8.

On the bar code display device 7 of this embodiment appears a bar code with start code bars 47, stop code bars 48, and a number of other wide and narrow character bars 49 representing the coin total in a code equivalent to the standard code. The data displayed in bar code cannot be read by eye.

Using a code which is equivalent to the standard code ensures that the code can be read easily and allows a general-purpose bar code reader to be used.

Figure 22:
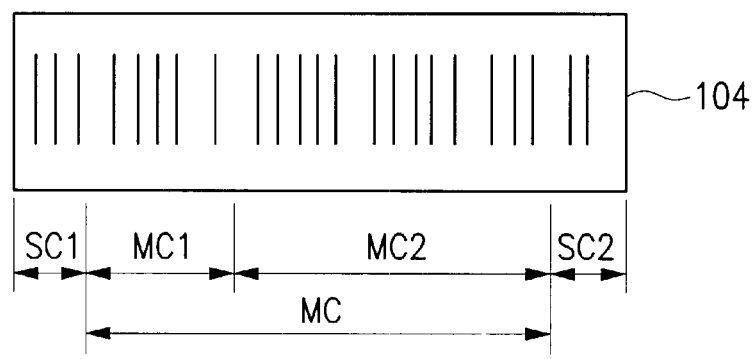
FIG. 22 is a front view of a bar code.

As another example, the machine code identifying this game machine could be displayed in bar code along with the coin total. This would simplify the task of finding a sum total of the coins inserted in all the game machines. One example of such a bar code is shown in FIG. 22 discussed further herein.

Figure 17:
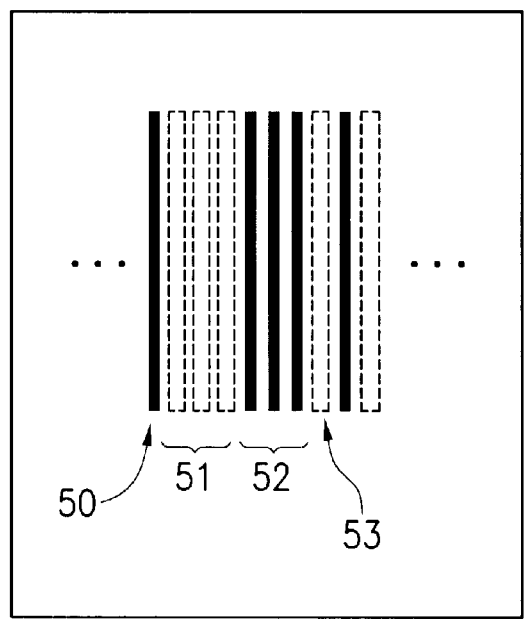
FIG. 17 shows the configuration of a bar code.

As can be seen in FIG. 17, the code consists of four types of bars: narrow black bars 50; wide white bars 51, which comprise three narrow bars; wide black bars 52, also comprising three narrow bars; and narrow white bars 53.

In bar code display device 7, start code bars 47 and stop code bars 48 are displayed permanently by means of wiring. This reduces the number of dots which LCD driver 35 must produce.

As is shown in FIG. 16, this embodiment of bar code display device 7 has a battery charge display 54 above the bar code display to show whether sufficient charge is left in battery 18. The charge is displayed at the same time as the bar code. If the amount of charge remaining in the battery exceeds a given level, a bar is displayed in battery-shaped frame 55. When the amount of charge falls below this level, the bar is not displayed. This informs the user that the charge remaining in the battery has fallen below the specified level.

Because a display indicates when the charge remaining in battery 18 has fallen below a given level, all malfunctions due to the effects of a dead battery can be prevented.

Alternatively, as another implementation of this invention, a light could flash to indicate that the charge remaining in battery 18 had fallen below a given level.

Figure 18:
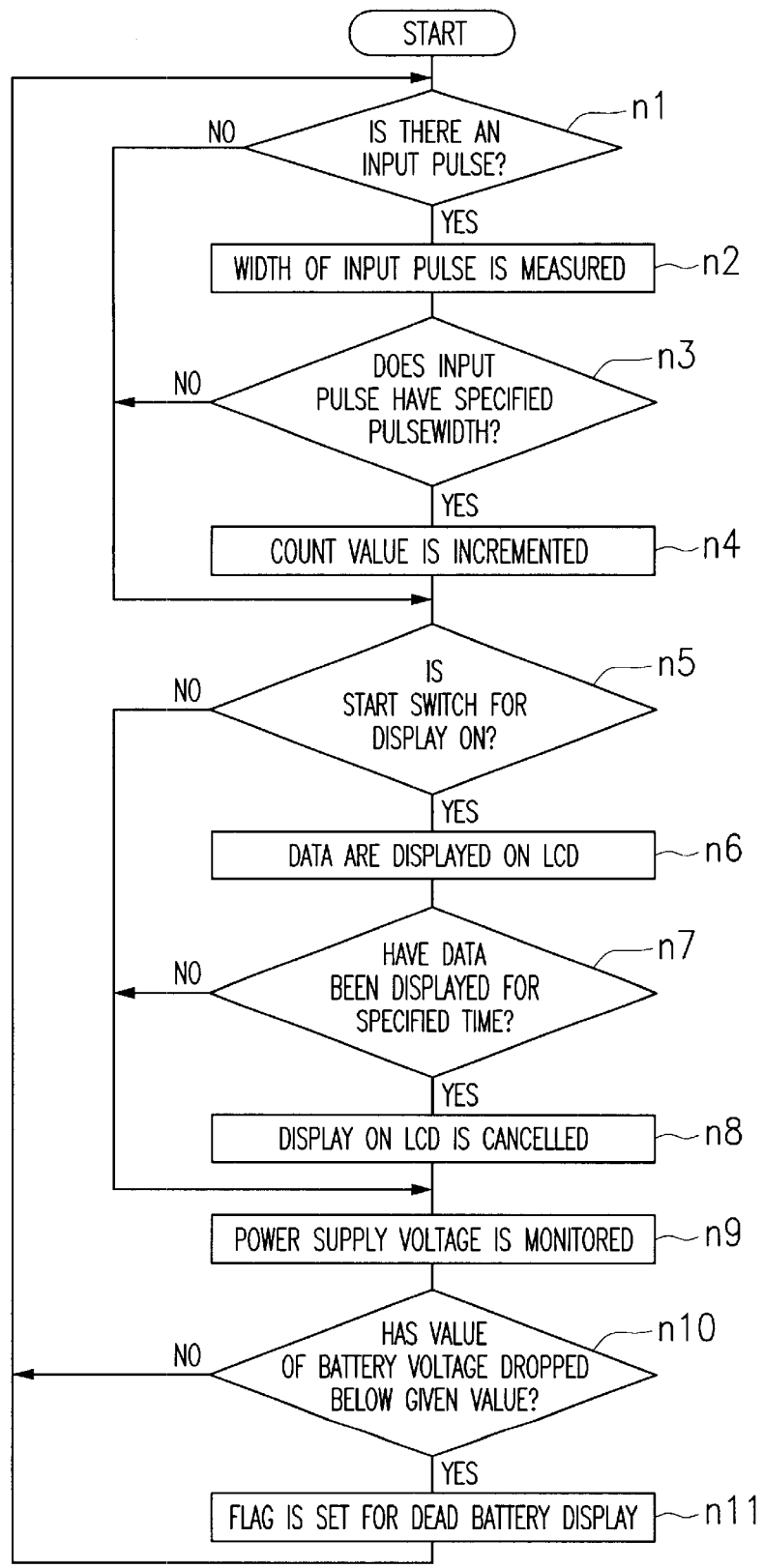
FIG. 18 is a flowchart of the operations executed by the data display device.

FIG. 18 is a flowchart of the operations executed by a bar code display device 7 which is configured as described above.

First, it is determined whether there has been an input pulse from coin detector 32 (Step 1). If there has, the width of the waveform of the input pulse is measured (Step 2). It is determined whether the width as measured is equal to the specified width (Step 3).

The specified pulsewidth should be selected so that it will not be affected by chattering, and so that the pulse transmitted when the power supply to game machine 1 is removed at the end of the day is not included in the total. It could, for example, be in the range of 30 msec to 1 sec.

If in Step 3 the width of the waveform of the input pulse is determined to be the specified pulsewidth, it is taken to be an input pulse resulting from the insertion of a coin, and the total is incremented (Step 4). A determination is made as to whether start switch 9 is on (Step 5). If it is determined that start switch 9 is on, data which include the total value will be shown as a bar code on LCD 8, and the battery charge will also be displayed (Step 6). A judgment is made as to whether the display has been shown for the specified period of time (Step 7). If it has, the display on the screen is canceled (Step 8), and we proceed to Step 9. The data are displayed, then, for a fixed period of time only, and only when start switch 9 is actuated. This reduces the power consumption.

In Step 9, the power supply voltage is checked, and it is determined whether the voltage value of battery 18 has dropped below a given level (Step 10). If it has, a flag is set to indicate that the battery is dead (Step 11), and we return to Step 1.

The bar code shown on LCD 8 of bar code display device 7 is read with a hand-held bar code reader, as discussed above. From this bar code is decoded the number of coins inserted (the amount of sales). To accomplish this task, a general-purpose bar code reader can be used, for example, the same kind of bar code reader used conventionally to read bar codes printed on or glued to labels.

As was discussed above, this device calculates the number of coins fed into a game or vending machine and displays the total it calculates on LCD 8 in the form of a bar code. The data content of the bar code which is displayed is not visible to the human eye. The number of coins inserted (the total sales) will not be legible to anyone but an authorized person. This scheme enables swift and accurate collection of sales totals and better sales control. Because sales and inventory control can be based on this total, it can be accomplished more efficiently.

Using bar code processing in this way to control coin sales and product control enables the merchant to avoid human errors such as visual misreads. Although this scheme involves only one person, it effectively prevents pilfering and stealing accomplished by deception, as by tampering with the device.

In the embodiment we have been discussing, a single specific denomination of coin was inserted in the machine. However, in a case in which the coins to be counted are of various denominations, for example, 5 cent, 10 cent, and 25 cent, a device can be provided to distinguish the different types of coins. The total of each type can then be calculated and displayed as a bar code.

In the embodiment discussed above, bar code display device 7 calculated the total number of coins inserted in the machine and displayed this total as a bar code. As an alternative, the device could be given the capability to calculate the total amount of money inserted, based on the number of coins, and this cash total could be displayed as a bar code. It would also be possible for both the number of coins and the cash total to be displayed as a bar code.

Although in the embodiment discussed above the invention is implemented in a game machine, it is by no means limited to that application only. It could also be implemented in an amusement machine, a vending machine, or any other machine in which coins or tokens can be inserted.

Figure 19:
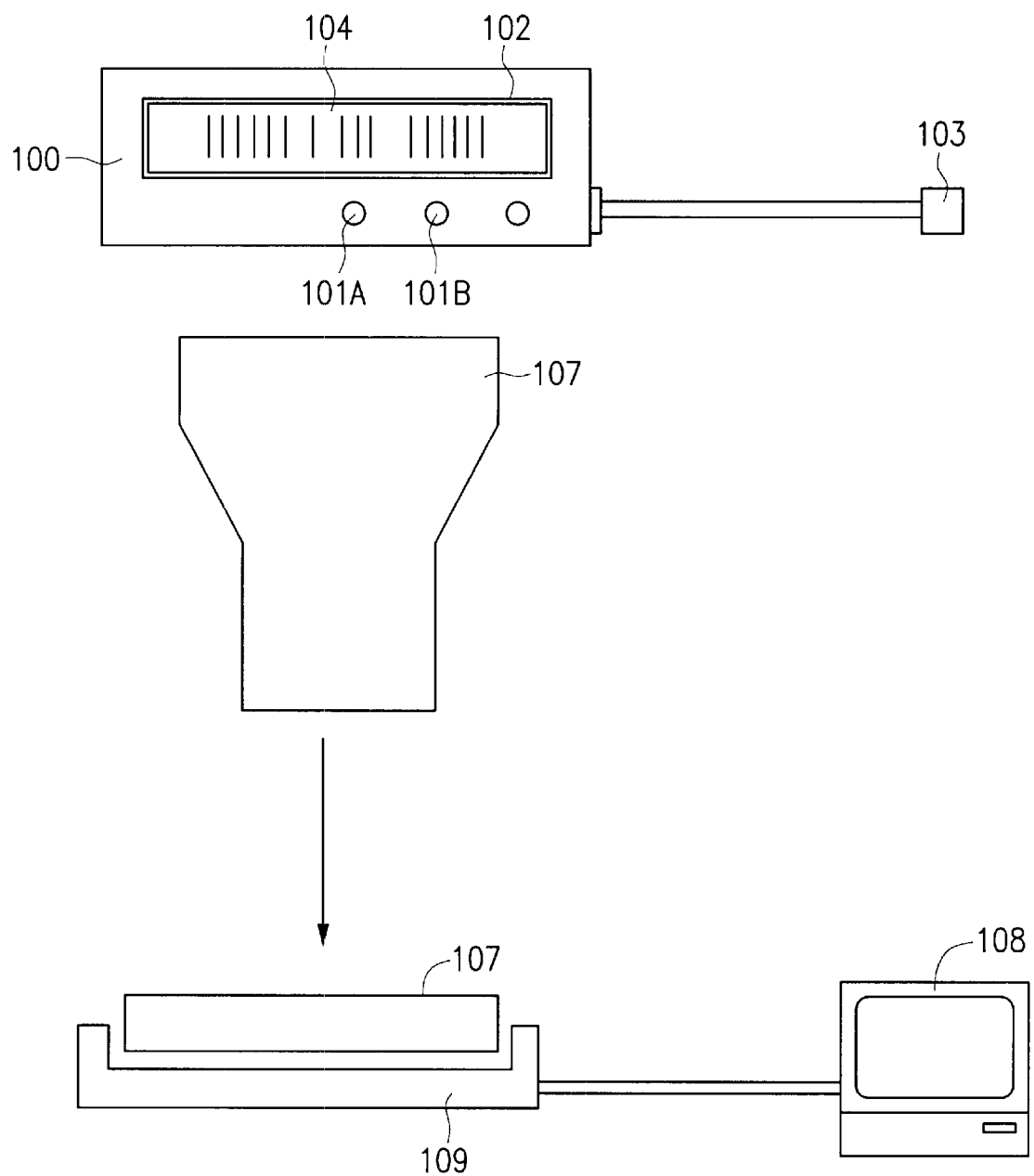
FIG. 19 is a total configuration of sales/inventory management systems using the data display device.

FIG. 19 is a hardware configuration of the sales/inventory management systems which proceeds after coin payment according to this embodiment. In this configuration, bar code display device 100 is attached to a main unit (not shown) such as game machines or amusement machines. Bar code display device 100 has display unit 102 which is configured by matrix-type crystal liquid display (LCD). This bar code display is equipped with count clear key 101A to clear the total value, initial clear key 101B to reset the main unit, and start switch 9. Data connector is connected to this bar code display device 100 to receive such as input data of inserted coins, and tokens.

Bar code reader 107 is a handy type bar code reader which reads bar code displayed on LCD display unit 8 of bar code display device 102. Personal computer 108 calculates a number of inserted coins (sales amount or inventory amount). This computer is connected to terminal unit 109 which is compatible to bar code reader 107. After reading bar code, computer 108 calculates the total number of inserted coins or total amount from zero-cleared point to the latest reading. Computer 108 is used for the inventory control and other sales management.

Figure 20:
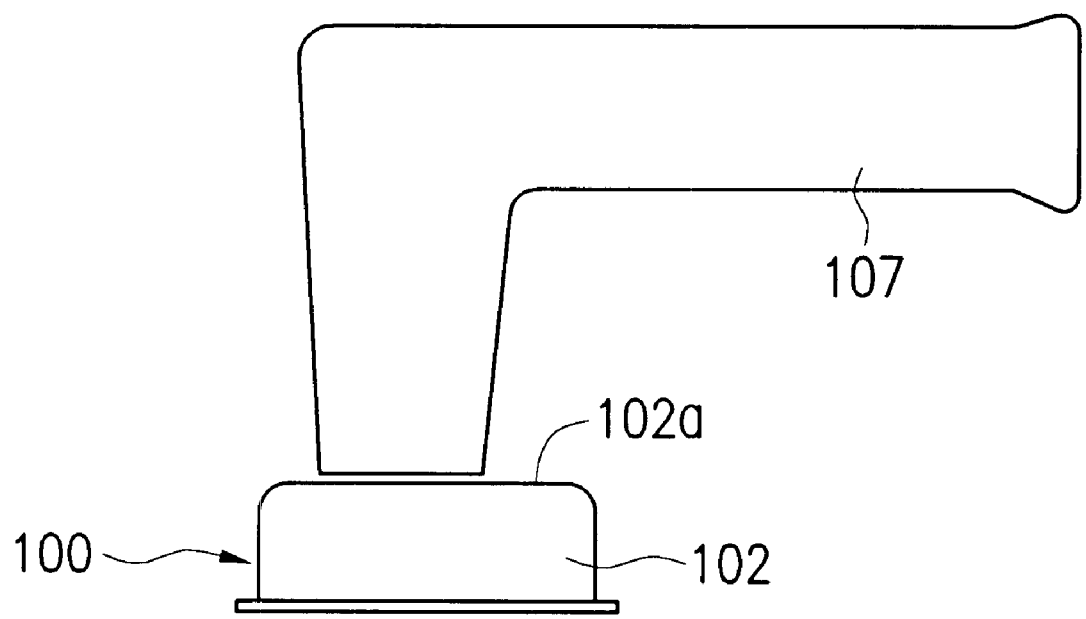
FIG. 20 is a side view during scanning a bar code by bar code reader unit.

As shown in FIG. 20, scanning the bar code on LCD display unit 102 of bar code display device 100, bar code reader 107 can read bar code on LCD display unit 102, and convert the bar code into the number of inserted coins, the total of sales or the inventory amount. This bar code reader 107 can be a general purpose bar code reader to read printed or labeled bar code. After the reading by bar code reader 107, LCD display unit 102 can be cleared to zero by pushing count clear key 101A.

Figure 21:
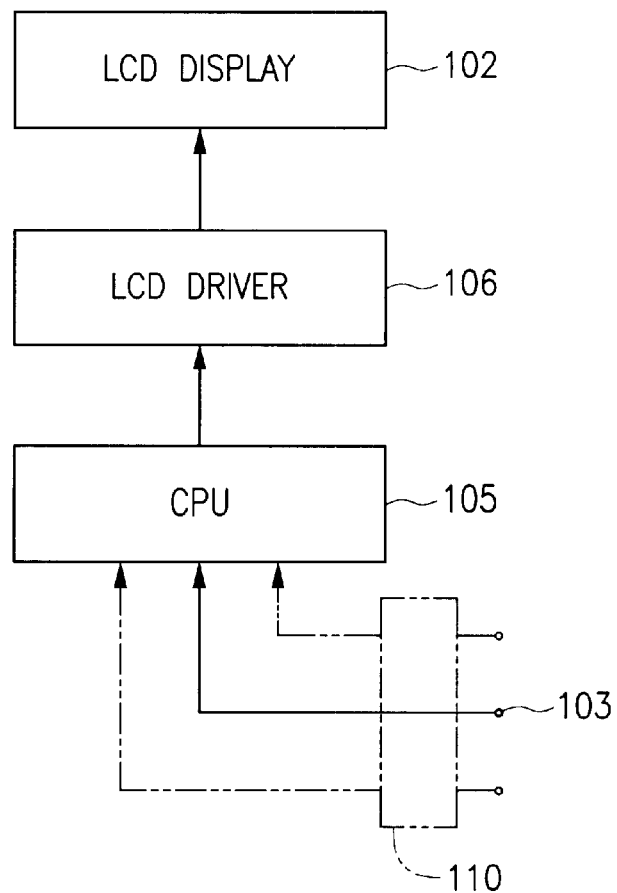
FIG. 21 is an operational configuration of an LCD display used with the system.

In the sales management system and inventory control system after coin payment shown above as shown, for example, in FIG. 21, the incoming value input to input terminal 103 after the coins are inserted, is calculated and the total value of the incoming value is converted to a bar code and displayed on LCD display 102 via LCD driver 106. Because this displayed bar code is represented in a form not directly comprehensible to a person, the number of coins or the amount of money inserted will not be legible to an unauthorized person when the bar code is read by bar code reader 107, and processed by compatible terminal unit 109 and computer 108. The use of a bar code reader allows the operator to obtain a total swiftly and accurately. This scheme also can be used for sales/inventory management efficiently based on the total value obtained.

FIG. 22 shows a sample bar code 104. The sample bar code 104 comprises a start-code SC1, a stop code SC2, and a standard product code MC having a numbering code and narrow bars. The standard product code MC could comprise a machine code MC1 and a coin count value MC2. None of these codes are in a form directly comprehensible to a person.

This scheme for sale management and inventory systems using bar code prevents errors due to reading the total by eye, and it also prevents pilfering and stealing accomplished by deception. This system requires only one operator.

In the system mentioned above, only one kind of coin will be inserted in to the system. If more than one kind of coins, such as 5 cent, 10 cent, 25 cent coins are expected to be inserted, the corresponding detecting units or input processing unit to detect the type of coins can be added prior to input terminal 33. Thus the total value can be calculated in CPU of the bar code display device 7 and displayed on LCD display 8.

LCD display 8 in bar code display device 7 is preferably liquid crystal display, but it can be CRT, semiconductor display array, or LED array.

This system can be also used for various kind of vending machines which accept bank notes, and for game machines such as slot machines which handle some other currency substitute. Therefore, alternate embodiments of coin detector 32 could serve as a currency substitute detector to detect currency substitutes such as tokens or gameballs. Similarly, processing unit 36 could be programmed to process an output of the currency substitute detector.

With the invention described above, the number of coins inserted into a machine is calculated and either this value, the amount of money inserted as based on this value, or both are displayed. Because this value is displayed in the form of a bar code, the number of coins or the amount of money inserted will not be legible to an unauthorized person. The use of a bar code reader allows the operator to obtain a total swiftly and accurately. This scheme prevents errors due to reading the total by eye, and it also prevents pilfering and stealing accomplished by deception, as by tampering with the device.

Because a battery is built into the device, there is no need to supply power from the exterior. This allows the user more options in selecting where he wishes to mount the device. And because the amount of charge remaining in the battery

18 is monitored and displayed, all malfunctions due to the effects of a dead battery can be prevented.

The bar code is displayed for a given period of time only when the start switch is actuated. This arrangement allows power consumption to be reduced.

The aforesaid calculation device calculates only the output pulses of the coin detector device which have a specified pulsewidth. This prevents the calculation from being affected by chattering so that an accurate total can be obtained.

The aforesaid bar code is specified as equivalent to a standard product code. This will ensure that it can be read easily and that a general-purpose bar code reader can be used.

The sales/inventory management systems according to this invention converts, after coins are inserted, the incoming value to a bar code. The displayed bar code is then read by a bar code reader, and processed by the bar code. In this fashion, the income value of the coins can be obtained accurately and swiftly without errors due to reading the total by eye. The incoming value of coins will not be legible to an unauthorized person. This scheme also prevents pilfering and stealing accomplished by deception, as by tampering with the devices, or finds such a deception easily. Because of these reasons, only one person will be enough to manage for the sales management, and it saves the labor cost.

A calculating unit allows the collection of the sales data represented by bar code to a data center from a plurality of the game and amusement machines located at many different places, thus the system can monitor the grand sales total at one data center.

A liquid crystal display can display a bar code and the display can be a general purpose bar code reader. This enables the reading more accurately, and the sales management resulting from this reading can be also accurate.

A bar code display device can be connected with a coin detecting means to detect a type of inserted coins. In this configuration, the system is not limited to detect only one type of coin, but also detect various kind of coins.

If coins are inserted in the main unit during the disconnection of the electrical interface means which interfaces between driver circuits for the coin detecting unit/the display device, and a main frame of the sales control system, then the system will be set inoperative automatically. Thus when someone disconnects the electrical interface intentionally for deception, the system can prevent deception which may happen that, by disconnecting the above electrical interface unit, the main unit works normally, but the incoming value at the bar code display is set as no change.

When coins are inserted in the system, the total of the incoming value will be converted into a bar code, the bar code will be read by the bar code reader, then the processing means will proceed to calculate the grand total of the incoming coins. This process will not be legible to an unauthorized person. The use of a bar code reader allows the operator not only to obtain a grand total swiftly and accurately, but also to manage the inventory control efficiently.

What is claimed is:

1. A method for monitoring sales/inventory that is operable by a single operator to prevent pilferage, the method comprising the steps of:

providing a coin-detector at a remote location that generates input data, a display unit that displays output data as an image display solely in a form not directly comprehensible by the operator not skilled in that displayed form, and a portable reader unit that reads the output data;

detecting coins and currency substitutes input into the coin detector to generate the input data representative of the coin and currency substitutes;

processing the input data and displaying the corresponding output data on the display unit solely in the form not directly comprehensible by the operator not skilled in that displayed form and not displaying any output data in a form that is directly comprehensible by the operator at any time;

reading the output data at the remote location by the portable reader unit to calculate a receipt total; and collecting the coin and currency substitutes, wherein the operator does not know a receipt total of the coin and currency substitutes in the input data at the remote location, and the receipt total in the input data is read at a location other than the remote location and compared to the collected coin and currency substitutes and thereby any undetected pilferage of the collected coin and currency substitutes is preverted.

2. A sales/inventory management system comprising a coin detector, located at a remote location, that generates input data representative of detected coins and currency substitutes;

a processing unit at the remote location, connected to the coin detector, that process the input data and generates output data;

a display unit that displays the output data as an image display solely in a form that is not directly comprehensible by an operator not skilled in the displayed form wherein said display unit is configured to not display any output data in a form that is directly comprehensible by the operator at any time; and a portable reader unit, operable by the operator to read the output data at the remote location, wherein the operator that collects the coin and currency substitutes and operates the reader unit is not able to comprehend the output data, and wherein the output data is read at a location other than the remote location and compared to the input data representative of the coin and currency substitutes and thereby any undetected pilferage of the collected coin and currency substitutes is prevented.

3. The sales/inventory management system according to claim 2, wherein said form not directly comprehensible by the operator is a bar code.

4. The sales/inventory management system according to claim 3, wherein said reader unit is a bar code reader unit.

5. The sales/inventory management system according to claim 2, wherein said output data is a total based on said coins and currency substitutes.

6. The sales/inventory management system according to claim 2, further comprising a system detection unit that detects a disconnection between said coin detector and said processing unit.

7. The sales/inventory management system according to claim 6, wherein said system detection unit sets said system inoperative when said disconnection is detected.

8. The sales/inventory management system according to claim 2, wherein said system is a system used in a game machine, amusement machine or an automatic vending machine.

* * * * *

UNITED STATES PATENT AND TRADEMARK OFFICE
CERTIFICATE OF CORRECTION

PATENT NO.        : 6,525,698 B1                                           Page 1 of 1
APPLICATION NO.   : 08/566406
DATED             : February 25, 2003
INVENTOR(S)       : M. Takechi et al.

It is certified that error appears in the above-identified patent and that said Letters Patent is hereby corrected as shown below:

ON THE TITLE OF THE PATENT:

Item (73) Assignee:

Please change "Omrom Corporation" to --Omron Corporation--.

Signed and Sealed this

Twenty-fifth Day of March, 2008

JON W. DUDAS
*Director of the United States Patent and Trademark Office*